ered July 10, 1962

3,043,744
ANTHELMINTIC COMPOSITIONS AND METHOD OF USE

Norman C. Brown, John E. N. Sloan, and Philip A. Kingsbury, Berkhamsted, England, assignors to William Cooper & Nephews, Inc., Chicago, Ill., a corporation of Illinois
No Drawing. Filed Dec. 8, 1958, Ser. No. 778,766
Claims priority, application Great Britain Dec. 20, 1957
7 Claims. (Cl. 167—53)

The present invention relates broadly to anthelmintic compositions and the preparation thereof, and is more specifically concerned with a pharmaceutical preparation especially suitable for expelling or destroying intestinal worms, the preparation comprising an ester of dichlorophen.

It is known in the prior art that safe and efficient control of adult cestodes in vertebrates may be accomplished by use of 2:2'-dihydroxy-5:5'-dichlorodiphenylmethane, commonly referred to as dichlorophen. The principal disadvantage or objection to the use of this anthelmintic is that the normal grades of the compound which comply with specifications of the British Veterinary Codex or equivalent United States publications have an unpleasant taste and are not readily palatable to animals, even when mixed with tasty foods. While much of the unpleasant taste can be removed by recrystallization, it has been found that even rigorous purification does not produce a completely tasteless product.

It has been discovered by applicants that esters of dichlorophen derived from acids selected from the group consisting of acetic, propionic, butyric, caproic, enanthic and lauric acids eliminate the problems of the prior art compound. Specifically, the esters of dichlorophen are not only efficient anthelmintics in the control of adult cestodes in vertebrates, and particularly in carnivores, but the named dichlorophen esters are esesntially tasteless and are thereby all acceptable to animals when mixed with food. Moreover, the highly desirable attribute of essential absence of taste is retained even when the compounds are not in a high state of purity.

It is to be appreciated that the tasteless characteristic of the present compounds is of important advantage in veterinary medicine since normally a relatively large dosage of the anthelmintic is required for effective results, and many animals resist a large dose. Further, the oral administration of large dosages of the anthelmintic poses a particular problem with dangerous animals. In addition, the freedom of taste of the dichlorophen esters renders the compositions of benefit in medical practice for the eradication of tapeworms in human beings.

It is accordingly an important aim of the present invention to provide a pharmaceutical preparation for anthelmintic use, which comprises an ester of dichlorophen and characterized by an essentially complete lack of taste.

Another object of the invention lies in the provision of an anthelmintic composition comprising an ester of dichlorophen, the ester preferably being selected from the group consisting essentially of acetates, propionates and butyrates.

Still another object of this invention is to provide a composition of the character described, and which may be readily diluted or mixed with solid or liquid foods, and which may also be compounded as pellets, pills or capsules for direct administration.

A further object of the present invention is to provide a method of preparing an anthelmintic composition, which includes the step of reacting a mixture comprising dichlorophen and acetic anhydride or an acid chloride selected from the group consisting essentially of propionyl, butyryl, caproyl, enanthoyl, and lauroyl chlorides.

Other objects and advantages of the invention will become more apparent as the description proceeds.

A safe and efficient anthelmintic or taenicide characterized by an essential absence of taste and effective when administered to either human beings or animals is preferably prepared utilizing 2:2'-dihydroxy-5:5'-dichlorodiphenylmethane as the starting material and mixing therewith acetic anhydride or an acid chloride selected from the group consisting essentially of propionyl, butyryl, caproyl, enanthoyl, and lauroyl chlorides. By way of illustration and without limitation as to the method of preparation, 2:2'-diacetoxy-5:5'-dichlorodiphenylmethane has been prepared by mixing 1 part by weight of 2:2'-dihydroxy-5:5'-dichlorodiphenylmethane with 1.1 parts by weight of acetic anhydride and 0.01 part by weight of sulfuric acid having a specific gravity of 1.84. The mixture was heated to 100° C. for about one hour, and after the mixture had cooled moderately, 0.1 part by weight of water was added. After standing for a short period, the homogeneous solution was poured into water, and it was found that diacetoxy-dichlorodiphenylmethane separated as a solid. The solid was separated by filtration and purified to provide a compound having a melting point of 122–30° C.

Dichlorophen ester derivatives of the named acids other than acetic may be prepared in a somewhat different manner, utilizing propionyl, butyryl, caproyl, enanthoyl or lauroyl chloride, as the case may be. Specifically, the propionate may be prepared by adding 27 parts of 2:2'-dihydroxy-5:5'-dichlorodiphenylmethane to 50 parts of benzene and 20 parts of pyridine. Propionyl chloride (20 parts) dissolved in an equal amount of benzene is then added during 20 minutes maintaining the temperature below 30° C. The mixture is then heated under reflux on a water bath for one hour. After allowing to cool, the mixture is diluted with an equal volume of diethyl ether and water (25 parts) added followed by shaking and stirring. The lower aqueous layer is discarded and the upper layer washed successively with dilute hydrochloric acid, 5% sodium carbonate and water. After drying the solution with potassium carbonate, the volatile solvent is evaporated. The residue may be recrystallised from alcohol or petroleum ether giving a colorless product having melting point about 91° C.

The other esters may be prepared in a similar manner, substituting the appropriate acid chloride for the propionyl chloride in the above example. For this purpose, 23 grams of butyryl chloride, 29 grams of caproyl chloride, or 47 grams of lauroyl chloride are used to produce the butyrate, caproate, enanthate or laurate. Their respective melting points are 61° C., 64° C., 57° C., and 64° C. While esters of the lower aliphatic acids such as the acetate, propionate and butyrate are preferred, the esters of dichlorophen derived from caproic, enanthic and lauric acid are similarly colorless solids devoid of a taste and smell detectable by dogs and cats, and accordingly the six dichlorophen esters disclosed are all acceptable to carnivores when mixed with liquid or solid foods.

Generally speaking, the copper and iron salts of dichlorophen are more difficult to prepare, while the salts of sodium and potassium present the problem of dissociation under the aqueous conditions which appertain in food, and accordingly are not characterized by an absence of taste. It is esesntially for these reasons that the esters of dichlorophen are the preferred compounds.

While the dosage concentration of the dichlorophen ester administered to a human being or animal depends upon a number of factors, including the particular ester employed, and in the case of animals, the amount which can readily be administered thereto, dichlorophen acetate is preferably administered to dogs and cats in an amount equivalent to 250 mg. per kilogram, or the appropriate therapeutic dose in the case of other animals. In this connection, 250 mg./kg. is regarded as the minimum dose for complete eradication of tapeworms in all circumstances. However, for large dogs the dosage may be as low as 200 mg./kg. Doses higher than 250 mg./kg. can easily be tolerated, as up to 400 mg./kg., but a dosage rate in the range of 200 to 300 mg./kg. is much preferred.

The ester may be mixed with a solid or liquid diluent which is edible in nature, including food stuffs. The normal solid animal food is preferred, and in this connection, the ester may be mixed with vegetable carriers such as ground wheat or maize or with certain powders such as talc or kaolin for administration to cattle, sheep or goats. Any of the esters may also be compounded as pellets, pills or capsules for direct administration to the animal. Alternatively, the esters may be compounded with other anthelmintics of a different type so as to provide a composition affording control over a wider spectrum of infestations. As for example, the admixture of one of the herein disclosed esters with suitable proportions of a salt of piperazine, such as piperazine adipate, affords a preparation which gives control over ascarids, oxyurids, and some strongyles, in addition to the control of tapeworms. Further, cyanacethydrazide may be used in combination with one of the present dichlorophen esters.

The effectiveness of the present anthelmintics has been proven by actual tests on animals. In one test, nine dogs having a weight range of 9 to 20 kilograms and known to have infections of *Taenia hydatigena* and *Dipylidium caninum* were selected. The dichlorophen acetate, 2:2′-diacetoxy-5:5′-dichlorodiphenylmethane, was employed in this test by incorporation in the minced meat food of each dog, the amount being sufficient to give a dose of 250 mg./kg. All dogs accepted the food with no indication of hesitation, and no evidence of revulsion was seen. Upon subsequent post-mortem examination no evidence of tapeworm was found. This same ester may, of course, be employed as a taenicide in human beings.

It is to be seen from the foregoing that applicants have provided an anthelmintic having substantial advantages over the parent dichlorophen. The pharmaceutical preparation herein disclosed is essentially devoid of taste and smell, and accordingly is readily accepted by animals when incorporated in food. The compound is easily capsulated, or may be orally administered in other forms. The disclosed method of preparation is easily performed and controlled, and provides by relatively simple purification methods a colorless solid which produces safe and efficient results. Further, relatively large dosages of the anthelmintic are not required, and this advantage is of particular importance with dangerous animals or those which resist a large dose. While the recommended dosage for dogs is an amount equivalent to 250 mg./kg., it is to be understood that this dosage may be varied depending upon the particular infection to be overcome, the length of the treatment, the particular ester employed, the method of oral administration, and numerous other factors.

It will accordingly be appreciated that variations and modifications may be effected in the compositions and procedures herein disclosed without departing from the novel concepts of the invention.

We claim as our invention:

1. A method of combatting helminth infection in domestic animals, which comprises administering to the host having such infection a composition comprising an amount of an ester of 2:2′-dihydroxy-5:5′-dichlorodiphenylmethane sufficient to produce anthelmintic action, the ester being a derivative of an acid selected from the group consisting of acetic, propionic, butyric, caproic, enanthic and lauric acids.

2. A method of combatting helminth infection in domestic animals, which comprises administering to the host having such infection a composition comprising an amount of 2:2′-diacetoxy-5:5′-dichlorodiphenylmethane sufficient to produce anthelmintic action.

3. A method of combatting helminth infection in domestic animals, which comprises administering to the host having such infection a composition comprising an amount of 2:2′-dipropionoxy-5:5′-dichlorodiphenylmethane sufficient to produce anthelmintic action.

4. A method of combatting helminth infection in domestic animals, which comprises administering to the host having such infection a composition comprising an amount of 2:2′-dibutyroxy-5:5′-dichlorodiphenylmethane sufficient to produce anthelmintic action.

5. A method of combatting helminth infection in domestic animals, which comprises administering to the host having such infection a composition comprising a salt of piperazine and an ester of 2:2′-dihydroxy-5:5′-dichlorodiphenylmethane, the ester being a derivative of an acid selected from the group consisting of acetic, propionic, butyric, caproic, enanthic and lauric acids.

6. An essentially tasteless veterinary anthelmintic composition in solid coherent unit dosage form, said composition including a salt of piperazine and an ester of 2:2′-dihydroxy-5:5′-dichlorodiphenylmethane, and said ester being a derivative of an acid selected from the group consisting of acetic, propionic, butyric, caproic, enanthic and lauric acids.

7. An essentially tasteless veterinary anthelmintic composition in solid coherent unit dosage form for administration to domestic animals in dosages between about 200 and 400 mg. per kg. of animal, said composition including a mixture of a member selected from the group consisting of salts of piperazine and cyanacethydrazide and an ester of 2:2′-dihydroxy-5:5′-dichlorophenylmethane, and said ester being a derivative of an acid selected from the group consisting of acetic, propionic, butyric, caproic, enanthic and lauric acids.

References Cited in the file of this patent

UNITED STATES PATENTS

| | | |
|---|---|---|
| 2,111,504 | Bockmuhl | Mar. 15, 1938 |
| 2,134,388 | Cherry | Oct. 25, 1938 |
| 2,212,509 | Cherry | Aug. 27, 1940 |
| 2,646,383 | Craige | July 21, 1953 |
| 2,799,617 | Forrest | July 16, 1957 |

OTHER REFERENCES

Buehler: J. Org. Chem., vol. 6, 1941, pages 902–907.

Marsh: Ind. and Eng. Chem., vol. 41, No. 10, 1941, pages 2176 and 2182.